United States Patent
Klevtsov et al.

(10) Patent No.: US 8,388,727 B2
(45) Date of Patent: Mar. 5, 2013

(54) CONTINUOUS AND SEMI-CONTINUOUS PROCESS OF MANUFACTURING TITANIUM HYDRIDE USING TITANIUM CHLORIDES OF DIFFERENT VALENCY

(75) Inventors: Andrey Klevtsov, Moscow (RU);
Alexander Nikishin, Moscow (RU);
Jury Shuvalov, St-Peterburg (RU);
Vladimir Moxson, Hudson, OH (US);
Volodymyr Duz, Hudson, OH (US)

(73) Assignee: ADMA Products, Inc., Hudson, OH (US)

( * ) Notice: Subject to any disclaimer, the term of this patent is extended or adjusted under 35 U.S.C. 154(b) by 704 days.

(21) Appl. No.: 12/655,937

(22) Filed: Jan. 11, 2010

(65) Prior Publication Data
US 2011/0171116 A1    Jul. 14, 2011

(51) Int. Cl.
*C01B 6/02* (2006.01)
*C22B 34/12* (2006.01)
*B22F 9/24* (2006.01)

(52) U.S. Cl. ............ 75/617; 75/363; 75/369; 75/620; 423/645

(58) Field of Classification Search .......... 423/645, 423/492; 75/363, 369, 617, 620
See application file for complete search history.

(56) References Cited

U.S. PATENT DOCUMENTS

| | | | |
|---|---|---|---|
| 2,205,854 A | 6/1938 | Kroll | |
| 6,136,060 A | 10/2000 | Joseph | |
| 6,168,644 B1 | 1/2001 | Fukasawa et al. | |
| 6,638,336 B1* | 10/2003 | Drozdenko et al. | 75/359 |
| 7,914,600 B2* | 3/2011 | Withers et al. | 75/366 |

* cited by examiner

Primary Examiner — Wayne Langel
Assistant Examiner — Syed Iqbal

(57) ABSTRACT

The invention relates to the manufacture of titanium hydride powder using continuous or semi-continuous process, and using titanium slag or synthetic rutile as raw materials, while hydrogen, titanium tetrachloride, titanium trichloride, titanium dichloride, and hydrogen chloride are participate as intermediate reaction products. The continuous comprises: (a) reduction of $TiCl_4$ to low titanium chlorides followed by cooling a mixture, (b) separating of residual $TiCl_4$ from solid low chlorides by heating the mixture in argon or vacuum up to 150° C. followed by removing the titanium tetrachloride from the mixture, (c) dissociation of $TiCl_3$ to $TiCl_2$ at 450° C. in vacuum followed by removal of gaseous titanium tetrachloride from the reaction zone, condensation to the liquid, and returning back into the reaction retort, (d) dissociation of $TiCl_2$ in vacuum at 750-850° C. to manufacture fine powder of metallic titanium and titanium tetrachloride, whereby hydrogen heated up to 1000° C. is used to accelerate this reaction, and (e) saturation of the fine titanium powder by hydrogen at 400-640° C. to manufacture final product of titanium hydride powder which is free of oxygen or nitrogen. The semi-continuous process includes the Kroll's process as the very first step.

14 Claims, 4 Drawing Sheets

CONTINUOUS AND SEMI-CONTINUOUS PROCESS OF MANUFACTURING TITANIUM HYDRIDE USING TITANIUM CHLORIDES OF DIFFERENT VALENCY

FIELD OF INVENTION

The present invention relates to the manufacture of titanium hydride powder using continuous or semi-continuous process, and using titanium slag or synthetic rutile as raw materials, while hydrogen, titanium tetrachloride, titanium trichloride, titanium dichloride, and hydrogen chloride are participate as intermediate reaction products. The resulting titanium hydride powder is suitable in powder metallurgy, of titanium alloys, and can be used in aircraft, automotive, armor, and naval applications, oil equipment, chemical apparatus, and other industries.

BACKGROUND OF THE INVENTION

Titanium powder for commercial use is presently produced by a hydride-dehydride (HDH) process, as disclosed in U.S. Pat. No. 6,168,644, by gas atomization, or by the plasma-rotating electrode process, as disclosed in U.S. Pat. No. 6,136,060. Raw materials for HDH process are titanium metal obtained by re-melting and processing titanium sponge, or ready-crushed titanium sponge itself. These raw materials are hydrogenated; then, the brittle hydrogenated titanium is ground to the desired powder size that is dehydrogenated by vacuum heating. Essentially, the titanium powder production is a multi-step, energy-consumable, high-cost industrial process including the manufacture of titanium sponge, which is the most expensive part of the technology.

Numerous disclosures for magnesium-reducing $TiCl_4$ and subsequent processing of the obtained titanium sponge are present in the art, starting from U.S. Pat. No. 2,205,854 granted to Wilhelm Kroll in 1940. Most developments were directed to improve the quality of the sponge by diminishing the final content of magnesium, chlorine, oxygen, and iron contaminants. Various processes have been developed during the last two decades for energy-saving, cost-effective, sponge-related technologies.

The manufacture of titanium powder from reduced titanium sponge or sponge-like product includes (a) magnesium-thermic reduction of titanium chlorides in a reactor, (b) preliminary distillation of the reaction mass to the content of magnesium chloride of 5-12%, (c) cooling of the obtained sponge block in argon, (d) crushing and grinding the sponge into the powder having a particle size of 0-12 mm, (e) preliminary drying of the powder at <250° C., (f) cooling and additional grinding, (g) final distillation of the powder from magnesium chloride residues by vacuum separation, (h) hydro-metallurgical treatment, (i) final drying, and (j) final grinding of the titanium powder.

In spite of saving time and energy in sponge production, this process is not cost-effective when considering titanium powder as the final product. In this process, the first stage of vacuum separation is carried out at 1020° C., which results in a solid sintered block of the reaction mass and increases the time of sponge distillation. Double-stage vacuum separation accompanied by multi-stage drying and grinding increases the process time and electric energy consumption, and significantly decreases the powder productivity. Besides, multi-stage hot drying increases the content of gaseous impurities in the obtained powder.

Periodic removal of exhaust magnesium chloride from the reactor bottom and cooling a reaction interface by argon flow reduced the time of sponge production, but neither the cost nor the energy of the entire process of powder manufacture is gained.

The same result, insignificant to powder cost, was reached in the process which increases the sponge yield by predetermined blowing of $TiCl_4$ at the temperature of <600° C. under argon into molten magnesium.

The electric power consumption was decreased by 20% using a condensing vessel in the reactor for removing unreacted magnesium and residual magnesium chloride from the reaction zone. This energy savings related only to sponge production and does not reflect on the total production cost because the obtained ductile sponge needs to be hydrided/dehydrided with the repetition of the multi-stage processing.

Productivity of the magnesium-thermic process was increased by the preliminary cleaning of $TiCl_4$ and accelerated the supply into the reactor. This method also related only to the sponge production and results mostly in the sponge quality.

A way of accelerating the distillation stage was offered also. According to this, the oxide impurities are partially soluble in fused $MgCl_2$ at a higher temperature, therefore the reduction process should be carried out at more elevated temperature and simultaneously increase feeding the reactor with $TiCl_4$ to obtain a porous titanium sponge, which facilitates the removal of fused $MgCl_2$ together with oxygen dissolved in it. Unfortunately, the higher temperature results in additional power consumption.

The titanium powder according to the U.S. Pat. No. 6,638,336 granted to Drozdenko et al. is manufactured by (a) magnesium-thermic reduction of titanium chlorides characterized by the formation of a hollow block of the reaction mass having an open cavity in the center of the block, (b) thermal-vacuum separation of the hollow block from excessive Mg and $MgCl_2$ at 850-950° C., (c) cooling of the obtained titanium hollow block in a $H_2$-contained atmosphere at an excessive hydrogen pressure, (d) crushing and grinding the hydrogenated titanium block, and (e) hydro-metallurgical treatment of obtained titanium powder in a diluted aqueous solution of at least one chloride selected from magnesium chloride, sodium chloride, potassium chloride, or titanium chloride. The hydro-metallurgical treatment of titanium powder significantly increases labor and time of the process, but however does not provide the desirable purity of the powder which contains magnesium and chlorine contaminants up to 1%.

All other known methods of producing titanium powder directly from magnesium-reduced sponge or sponge-like porous titanium compound have the same drawback: cost and energy savings are only realized for one or two stages, but not for the continuous multi-stage process, which makes none of these processes cost-effective.

Not one conventional process comprises the sponge or sponge-like hydrogenated porous titanium compound production adjusted specially to subsequent powder manufacture: sponge lumps are ductile and need to be treated by HDH process.

Also, all processes known from the prior art do not provide high productivity together with the sufficient purification of the hydrogenated titanium compound within one production cycle. All products require additional purification (either by hydration-dehydration or hydrometallurgical treatment) in order to remove impurities, especially magnesium and magnesium chloride and consume a lot of energy for crushing pieces to powder.

OBJECTIVES OF THE INVENTION

The object of the invention is to manufacture pure titanium hydride powder from titanium slag with recycling main quantity of hydride and chlorine without electrolyze process. Any additional treatment of the powder produced including crushing (in case if are using titanium sponge) should be excluded while exhaust materials of the process such as magnesium and magnesium chloride can be utilized readily.

Yet another objective of the present invention is to use the same equipment as used for the manufacture of said hydrogenated porous titanium compound.

It is also an objective to provide the cost-effective and highly-productive manufacture of purified titanium hydride powder from titanium slag or from magnesium-reduced hydrogenated porous titanium compound.

The supply of additional hydrogen also increases the process productivity.

Thus, titanium oxide and carbon are at the process entrance, while titanium sintered product and carbon monoxide are at the process exit. Chlorine and hydrogen are used in the technological cycle completely.

Cleaning of titanium tetrachloride and hydrogen before their supply into the reaction retort of stainless steel retorts is carried out high grade of purity in order to manufacture titanium hydride powder of high quality.

TABLE 1

Table of chemical reactions

| No | Reaction | Temperature, °C. | Pressure | Comments |
|---|---|---|---|---|
| 1 | $TiO_2 + 2C + 4HCl = TiCl_4 + 2CO + 2H_2$ | 800-1000 | Atmospheric | |
| 2 | $TiCl_4 + Ti = 2TiCl_2$ | 650-730 | Atmospheric | |
| 3 | $2TiCl_2 = Ti + TiCl_4$ | 800 | Atmospheric Vacuum | The rate of reaction is low at atmospheric pressure |
| 4 | $2TiCl_4 + H_2 = 2TiCl_3 + 2HCl$ | 500-700 | Atmospheric | |
| 5 | $TiCl_2 + H_2 = Ti + 2HCl$ | 1000 | Atmospheric | Excess of $H_2$ |
| 6 | $2TiCl_3 + H_2 = 2TiCl_2 + 2HCl$ | 500 | Atmospheric | |
| 7 | $TiCl_4 + H_2 = TiCl_2 + 2HCl$ | 799-850 | Atmospheric | Excess of $H_2$ |
| 8 | $2TiCl_3 = TiCl_2 + TiCl_4$ | 450 | Vacuum | |
|   |   | 500 | Atmospheric | |
| 9 | $TiCl_4$ | 136.4 | Atmospheric | Evaporation |
| 10 | $TiCl_4 + 2H_2 = Ti + 4HCl$ | 1000-2000 | Atmospheric | Excess of $H_2$ |
| 11 | $3TiCl_4 + Ti = 4TiCl_3$ | 650-730 | Atmospheric | Shortage of Ti |
| 12 | $Ti + H_2 = TiH_2$ | 400-800 | Atmospheric | |

The nature, utility, and further features of this invention will be more apparent from the following detailed description, with respect to preferred embodiments of the invented technology.

SUMMARY OF THE INVENTION

The continuous process of the manufacture of titanium hydride powder of the present invention comprises supplying a purified titanium tetrachloride ($TiCl_4$) and hydrogen into a reaction retort 1 (FIG. 1 and FIG. 2) to obtain a mixture of low chlorides of titanium that further are removing from the retort together with the liquid titanium tetrachloride by using a screw conveyor or any other method.

The temperature in the retort is maintained as such a level in order to keep the most of titanium tetrachloride in liquid state. A mixture of solid suspensions of low titanium chlorides with liquid titanium tetrachloride is directed portion-by-portion to stainless steel retorts 2 (FIG. 2). Hydrogen chloride formed in this process is directed in a salt chlorinator 3 (FIG. 2), where titanium tetrachloride, hydrogen and carbon monoxide are formed from supplied titanium slag and carbon. The carbon monoxide is separated from the gaseous mixture and directed to heat the salt chlorinator to improve the process productivity. The hydrogen goes back to the reaction retort.

Reactions presented in Table 1 and showed in FIG. 1-3 proceed in said stainless steel retorts sequentially. The continuity of the process is provided by permanent filling of the retorts that already went through the whole cycle. Empty steel retorts are charged one by one with the mixture of chlorides of different valency from the reaction retort.

Additional hydrogen is supplied to the process from a sintering furnace 4 (FIG. 2), where titanium hydride powder is sintered with simultaneous dehydriding of titanium parts.

The manufacture of titanium and titanium hydride powders by the continuous process does not include an electrolysis step.

The manufacture of titanium and titanium hydride powders by the semi-continuous process includes the use of titanium chlorides of different valency and titanium sponge as a raw material containing magnesium and magnesium chloride after the reduction upon the Kroll's process 5 (FIG. 4) but without the long step of vacuum separation.

The use of hydrogen in the invented processes is necessary as a heat source and both for transformation of titanium salts from one valency to another one and for the manufacture of titanium hydride at the final step in the form of fine suspended powder that significantly cuts production costs in the manufacture of titanium sintered shapes. In so doing, the step of magnesium chloride electrolysis is excluded from the technology.

When the titanium sponge is used as the raw material (in other words, when the invented process is joined with the Kroll's process), steps of grinding titanium or titanium hydride are excluded, too.

Titanium hydride manufactured according to the invention is suitable for manufacturing titanium parts by powder metallurgy techniques. Titanium hydride made by the invented continuous process has low manufacturing costs because such operations as electrolysis and mechanical grinding are excluded, as well as the use of magnesium.

The nature, utility, and further features of this invention will be more apparent from the following detailed description, with respect to preferred embodiments of the invented technology.

BRIEF DESCRIPTION OF DRAWINGS

For the purpose of facilitating an understanding of the invention, it is illustrated with the following drawings of a preferred embodiment thereof.

DETAILED DESCRIPTION OF THE INVENTION

Figure 1:
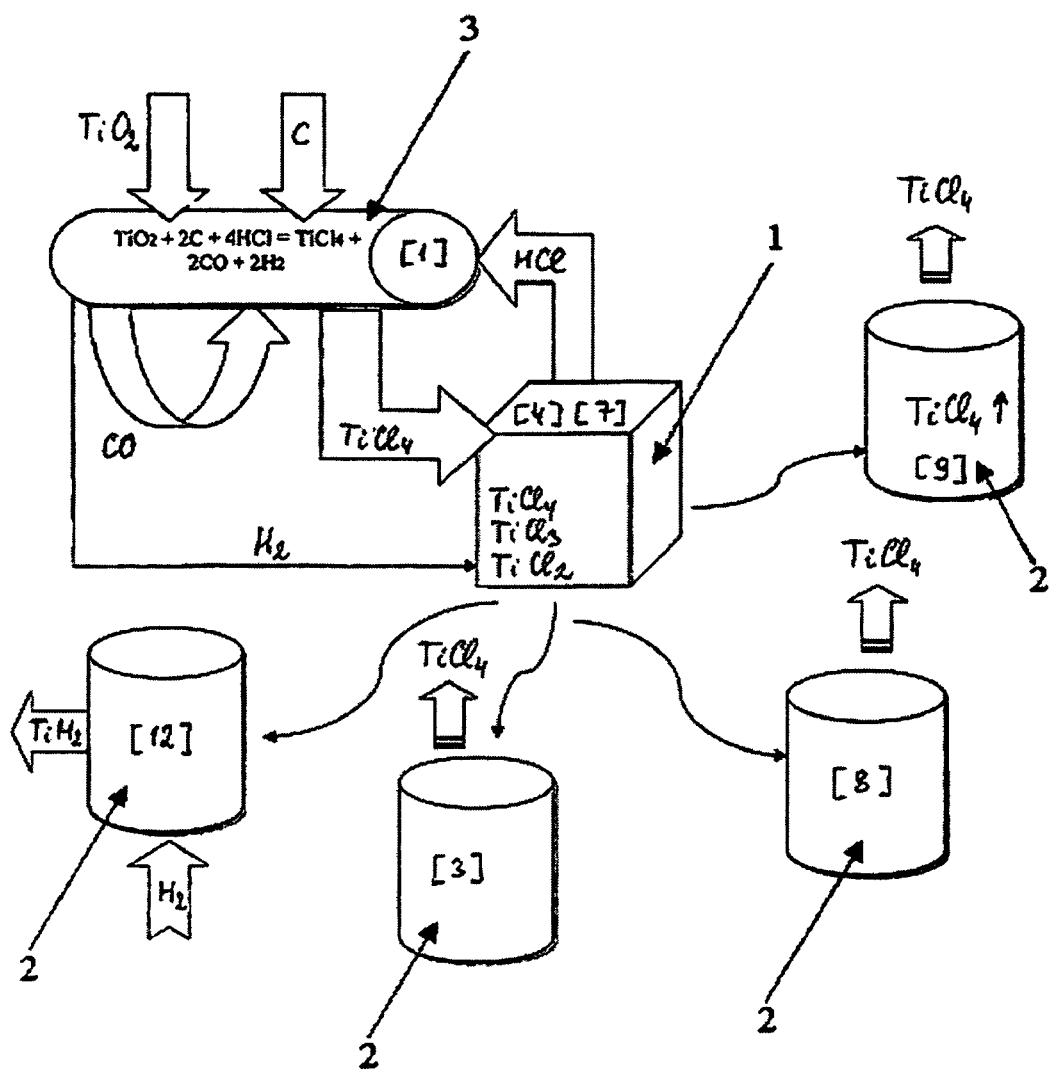
FIG. 1 A diagram of manufacturing the titanium hydride powder by using reactions of dissociation of titanium chlorides FIG. 2 The same as FIG. 1, with additional application of hydrogen as a heat transfer medium, as well as a reducing agent, FIG. 3 Schematic arrangement of apparatuses used in the continuous process of the manufacture of titanium hydride powder, FIG. 4 Schematic arrangement of processing steps used in the semi-continuous process of the manufacture of titanium hydride powder from the titanium sponge, All drawings have the next designations: 1—the reaction retort, 2—processing retorts, 3—the chlorination apparatus (the chlorinator), 4—the furnace of dehydrogenation of titanium during the processing of articles using powder metallurgy, 5—(FIG. 4) first step—Kroll's process, 6—next steps—(processing according reactions No. 2, 3, 5, and 12), and 7—the process of dehydrogenation of titanium. Numbers in square parenthesis designate the number of reactions in Table 1.

A. Continuous Process of the Manufacture of Titanium Hydride Powder of the Present Invention The continuous process of the manufacture of titanium hydride powder using titanium chloride compounds of different valency comprises the following steps:

(1) The first step of the continuous process includes blowing in hydrogen at 800-900° C. and atmospheric pressure into a reaction retort 1 (FIG. 1) filled with big amount of liquid titanium tetrachloride ($TiCl_4$). The hydrogen is blown in at the height of retort that is ⅓ of the total height of the retort filled with the liquid titanium tetrachloride ($TiCl_4$). Hydrogen initiates the reduction of $TiCl_4$ to titanium trichloride ($TiCl_3$) and partial reduction of $TiCl_4$ to titanium dichloride ($TiCl_2$) according to equations (1) and (2):

$$2TiCl_4 + H_2 = 2TiCl_3 + 2HCl \quad (1)$$

$$TiCl_4 + H_2 = TiCl_2 + 2HCl \quad (2)$$

at 500-700° C. (1) or 650-850° C. (2), whereby both reactions occur at the gas-liquid interface (where the gas is hydrogen, while the liquid is $TiCl_4$). The titanium trichloride ($TiCl_3$) and titanium dichloride ($TiCl_2$) are resulted from this reaction. Then, the mixture of $TiCl_4$ and $TiCl_3$ is cooled down to 40-50° C. to provide condensation of titanium trichloride ($TiCl_3$) and titanium dichloride ($TiCl_2$) in the solid phase because the melting point of $TiCl_3$ is 425° C. and the melting point of $TiCl_2$ is 1035° C. The mixture of solid reaction products is removed from the retort 1.

The resulting mixture of solid reaction products titanium trichloride and titanium dichloride with liquid titanium tetrachloride is removed from the bottom of retort 1 using one of known methods by a delivery screw or a blade-equipped tooling.

The hydrogen chloride HCl gas is evolved during the above mentioned reactions and directed to a chlorinator 3 that is filled with a liquid salt of sodium chloride NaCl. Both compounds HCl and NaCl are used for chlorination of titanium slag or artificial rutile in presence of carbon at ~900° C. according to the equation (3):

$$TiO_2 + 2C + 4HCl = TiCl_4 + 2CO + 2H_2 \quad (3)$$

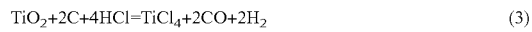

In order to avoid the reaction between hydrogen and titanium tetrachloride ($TiCl_4$) that may promote a formation of low chlorides of titanium before the operation of cleaning titanium from impurities, an accelerated condensation of titanium tetrachloride ($TiCl_4$) and a removal of hydrogen from the appropriate reaction retorts are undertaken in the chlorinator 3 design.

The titanium tetrachloride ($TiCl_4$) is subjected for cleaning using any known techniques. Hydrogen is used further in the next cycle for blowing-in into a tank of cleaned titanium tetrachloride ($TiCl_4$), while the carbon monoxide gas (CO) is used for heating the sodium chloride liquid in the chlorinator 3. Such approach provides the circulation of hydrogen and use of the heating energy of carbon monoxide for performance of the process, that improves the process effectiveness significantly.

(2) The second step of the continuous process includes removal of residual titanium tetrachloride ($TiCl_4$) from a suspension of solid chlorides by heating this suspension in the argon atmosphere or in vacuum up to 150° C. in the processing retort 2 that is above the temperature of evaporation of titanium tetrachloride 136.4° C.

Figure 2:
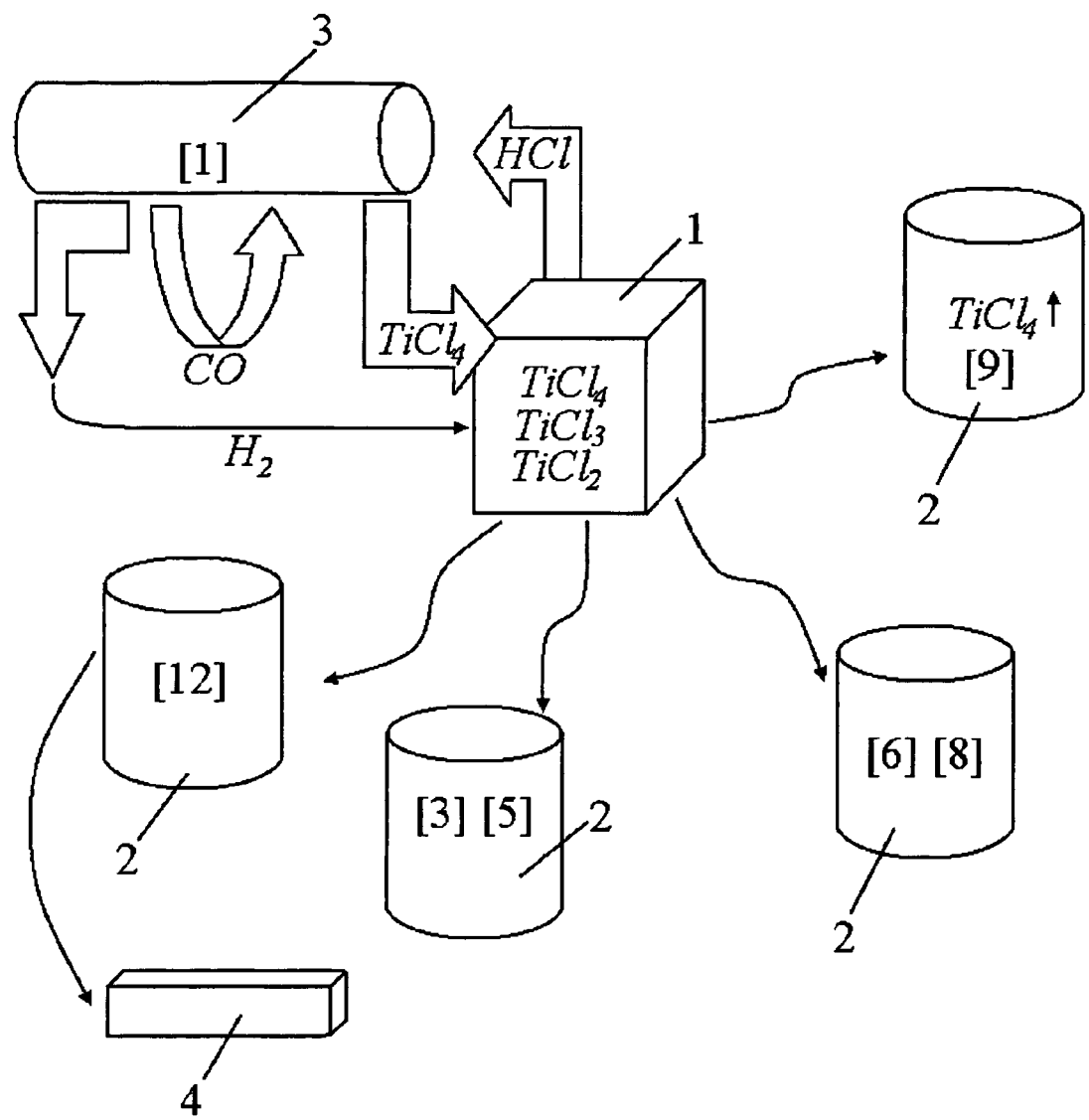
Figure 3:
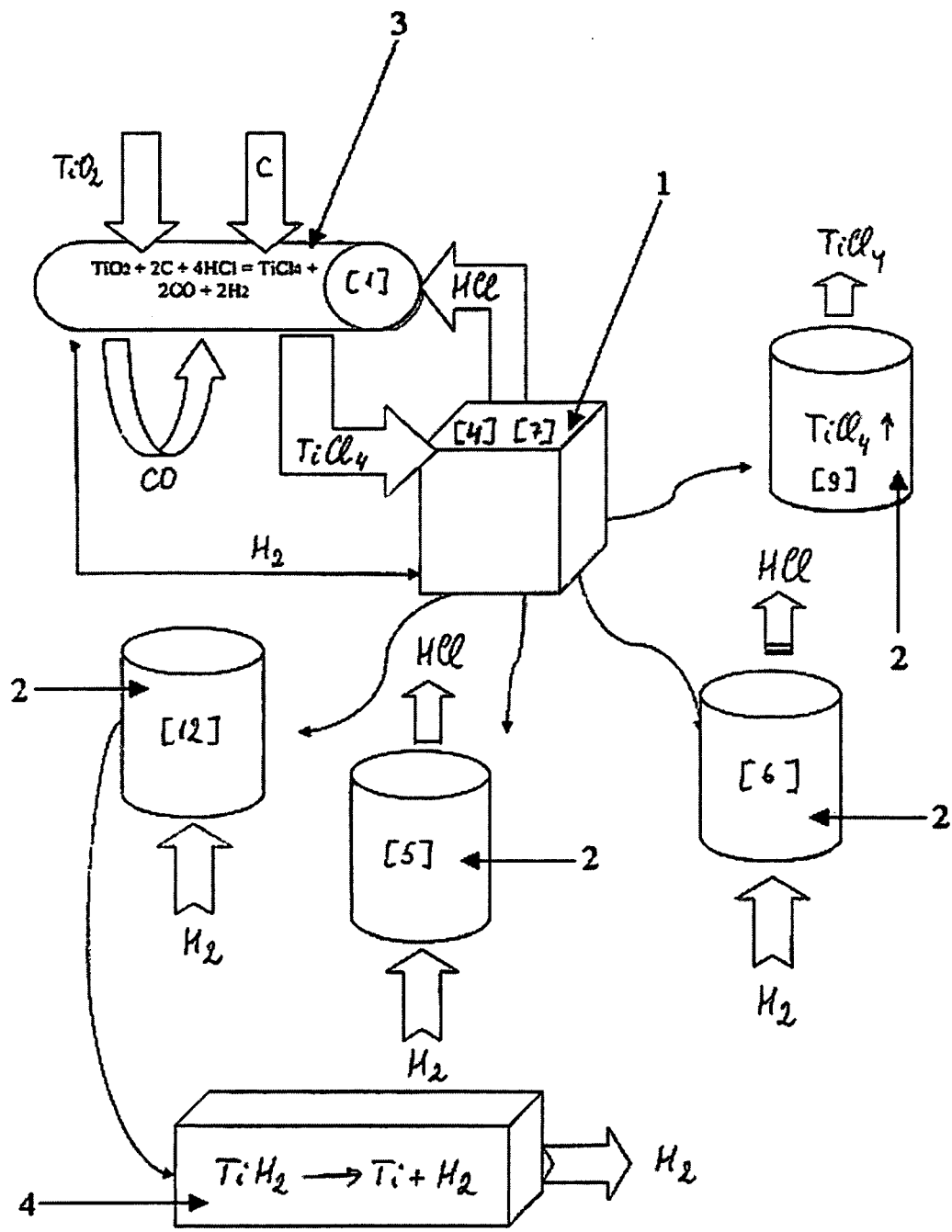

(3) The third step of the continuous process includes dissociation of titanium trichloride ($TiCl_3$) to titanium dichloride ($TiCl_2$) at 450° C. in vacuum in the processing retort 2 (see FIGS. 2 and 3) according to the reaction (4) or additional reduction of titanium trichloride ($TiCl_3$) to titanium dichloride ($TiCl_2$) by hydrogen according to the reaction (2) followed by removal of gaseous titanium tetrachloride from the reaction zone in the processing retort 2, condensation to the liquid, and returning back into the reaction retort 1, while the solid titanium dichloride is subjected to the next stage of process in the processing retort 2;

$$2TiCl_3 = TiCl_2 + TiCl_4 \quad (4)$$

(4) The fourth step of the continuous process includes dissociation of titanium dichloride at 800° C. in vacuum according to the reaction (5) to obtain metallic titanium in the form of fine powder and the titanium tetrachloride ($TiCl_4$). Due to low rate of this reaction, additional reaction retorts 2 are required to accomplish the process, or hot hydrogen is necessary which can accelerate the reaction if the resulting gas phase of the titanium tetrachloride ($TiCl_4$) would be removed from the reaction zone (see FIG. 2).

The titanium tetrachloride ($TiCl_4$) resulted from the reaction (4) is condensed and directed into the reaction retort 1. The titanium tetrachloride has the very high grade of purity, because all impurities left in the solid titanium. Therefore, the titanium tetrachloride can be subjected to the special, additional technological line of manufacturing the high-purity titanium hydride powder.

Hydrogen gas heated to 1100° C. is supplied into the reaction zone in order to accelerate the dissociation of titanium dichloride according to the reaction (5).

$$TiCl_2 + H_2 = Ti + 2HCl \quad (5)$$

The temperature of hydrogen is maintained sufficient to keep titanium dichloride in the gaseous state. The process is carried out at a slightly excessive pressure that provides necessary stoichiometric ratios of reactants, as well as an excess of hydrogen during the reaction. The resulting titanium metal powder is too fine in the particle size, and cannot be used immediately for manufacturing titanium shaped products due to fast and active oxidation in the contact with air. In other words, such fine titanium powder is not suitable for making metal parts by powder metallurgy techniques.

(5) The fifth step of the continuous process includes saturation of the above mentioned fine titanium powder with hydrogen at 400-640° C. in the furnace of dehydrogenation of titanium 4. In contrast to pure titanium powder, the powder of titanium hydride is not saturated by oxygen or nitrogen during discharging from the reaction retort 1, transportation in air, and storing. Titanium hydride powder is suitable in powder metallurgy, as well as for melting in electron-beam, plasma or induction furnaces having cold crucibles because hydrogen is being removed during melting or sintering in vacuum.

Three methods provide the continuity of described process:

(A) The first method includes discharging the titanium chloride mixture from the reaction retort that works in a permanent mode and transportation of the titanium chloride mixture in stainless steel tanks (or retorts) through different processing zones of the production line which are separated by buffer connection units, whereby said transportation retorts go successively through the following zones:
  (a) the zone of separating and removing titanium tetrachloride ($TiCl_4$) from a solid mixture of titanium trichloride ($TiCl_3$) and titanium dichloride ($TiCl_2$),
  (b) the zone of dissociation of titanium trichloride ($TiCl_3$) for titanium dichloride ($TiCl_2$) and titanium tetrachloride ($TiCl_4$) followed by the removal of the latter,
  (c) the zone of dissociation of titanium dichloride ($TiCl_2$) for the metallic titanium powder and titanium tetrachloride ($TiCl_4$) followed by the removal of the latter,
  (d) the zone of hydrogenation of the metallic titanium powder by hydrogen,
  (e) the zone of cooling the obtained titanium hydride powder,
  (f) the zone of discharging the titanium hydride powder from the retort, and
  (g) the zone of preparing the stainless steel retort to a new cycle charge of titanium chlorides from the reaction retort.

Moreover, the hydrogen, which is being emitted during sintering of titanium powder metallurgy, can be directed back into the reaction retort to improve the process effectiveness.

(B) The second method implies that charging of the mixture of titanium chlorides from the reaction retort is carried out into several stainless steel retorts in order to avoid an interruption of the process. The number of steel retorts is selected to provide charging them one by one continuously during the reaction cycle. All process steps (see FIG. 1-3) proceed in the reaction retort without its replacing, or without the replacing of reacting materials. In contrast to the first method, the hydrogen supply into the retort during the hydrogenation and cooling of final titanium powder is carried out from the bottom, while the discharging the powder from the retort is carried out by using a vacuum suction.

(C) The third method to provide continuous process of manufacturing titanium hydride powder differs from both described above methods. It includes supplying low titanium chlorides in the form of gases and/or liquids to a rotating drum placed in vacuum or in hydrogen atmosphere, where above mentioned reactions occur in the thin film surface layer, and the resulting, brittle titanium hydride is being removed from the drum surface. The sequence of process steps is the following:
  (a) separating and removing titanium tetrachloride ($TiCl_4$) from a solid mixture of titanium trichloride ($TiCl_3$) and titanium dichloride ($TiCl_2$) is carried out at 150° C., whereby the step is finished after obtaining the mixture of solid titanium trichloride ($TiCl_3$) and titanium dichloride ($TiCl_2$) without a trace of the titanium tetrachloride ($TiCl_4$);
  (b) supplying hydrogen from the bottom of the retort at 400° C. accompanied with continuous removal of hydrogen chloride and residual hydrogen from the retort, whereby the step is finished after full transformation of titanium trichloride ($TiCl_3$) into the titanium dichloride ($TiCl_2$);
  (c) dissociation of titanium dichloride ($TiCl_2$) for metallic titanium and titanium tetrachloride ($TiCl_4$) followed by removing the latter, whereby the step is finished after full transformation of titanium dichloride ($TiCl_2$) into the metallic titanium and full removal of the titanium tetrachloride ($TiCl_4$);
  (d) hydrogenation of the titanium powder by hydrogen at 400-640° C., whereby the step is finished after saturation of the powder by hydrogen and termination of hydrogen adsorption;
  (e) cooling the titanium hydride by cold hydrogen to accelerate the process, whereby the step is finished after the temperature of titanium hydride product below 150° C.;
  (f) discharging of the resulting titanium hydride from the processing retort using a vacuum device; and
  (g) preparing the processing retort to the next cycle charge of the titanium chloride mixture from the reaction retort.

The reaction retort is made from a stainless steel. It is equipped with a number of input tubing having many holes used for the distributed supply of hot hydrogen in the bath that is filled with the liquid titanium tetrachloride ($TiCl_4$). Also, these tubing are playing the role of evaporator of the titanium tetrachloride ($TiCl_4$) in order to provide an effective evaporation in the zone heated by hydrogen and the reaction heat. Simultaneously, the titanium tetrachloride in the gaseous phase reacts with hydrogen at hot surface of said tubing.

The liquid bath of the titanium tetrachloride has temperature from −23° C. to +136° C. The bath volume is selected to provide condensation of those vapors of titanium tetrachloride which did not reacted yet inside of the reaction retort. The process is controlled by changing the temperature of liquid phase and the temperature of inlet hydrogen to give the most optimal reaction run at different productivity. Both temperatures are controlled by known methods.

Each tubing used for supplying hydrogen into the reaction retort is insulated by a thermal-protecting coat that has a thickness in the range of 0.1-0.2 of tubing diameter. This is sufficient to allow evaporation of the titanium tetrachloride from the outside surface of the tubing and to provide running of the basic reaction of the process in the gaseous phase.

TABLE 2

Table of physical properties of titanium chlorides

| | TiCl2 | TiCl3 | TiCl4 |
|---|---|---|---|
| Melting temperature, ° C. | 1035 | 425 | −24.8 |
| Boiling temperature, ° C. | 1500 | 960 | 136.4 |

TABLE 2-continued

Table of physical properties of titanium chlorides

| | TiCl2 | TiCl3 | TiCl4 |
|---|---|---|---|
| Density, g/cm³ | 3.13 | 2.64 | 1.726 |
| Appearance in solid state | Black crystalline powder | Red or violet, chip-like or needle-like crystals | White crystals |

Figure 4:
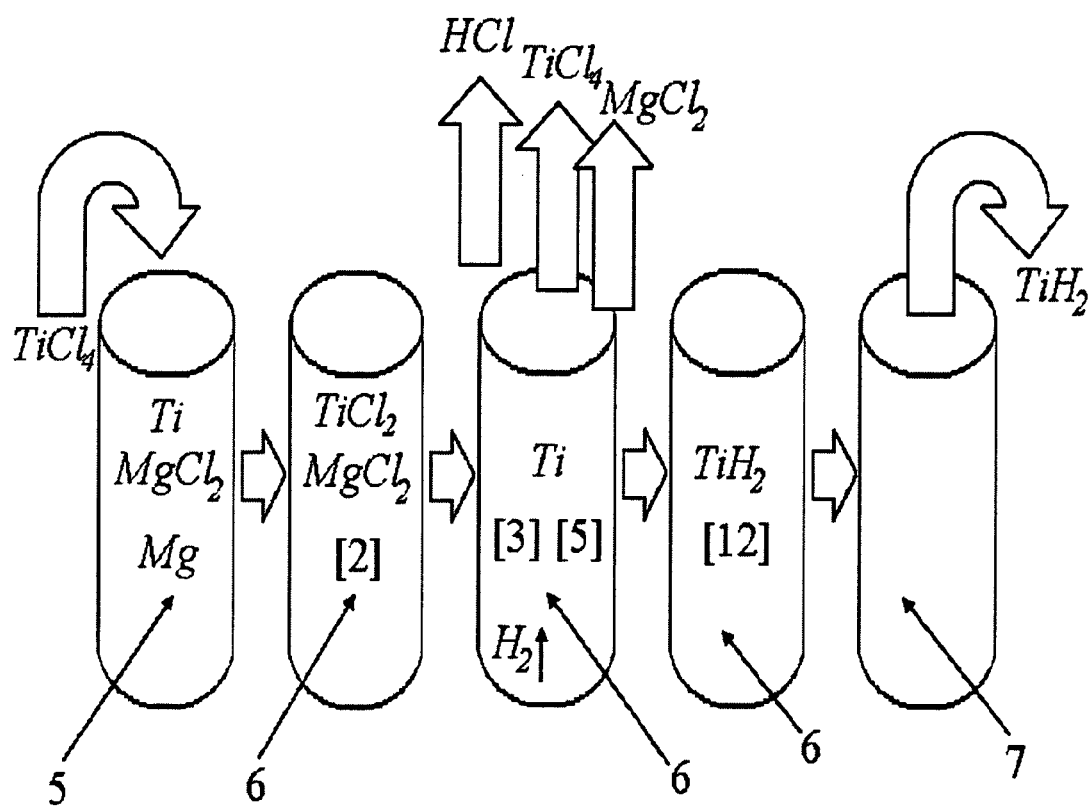

B. Semi-Continuous Process of the Manufacture of Titanium Hydride Powder of the Present Invention The semi-continuous process of the manufacture of titanium hydride powder (when a titanium sponge obtained from the Kroll process of magnesium-thermic reduction of $TiCl_4$ is used as a raw material) uses the low chlorides of titanium for the destruction of the titanium sponge 5 (FIG. 4). This approach allows to cut production and maintenance costs in the manufacture of titanium hydride powder.

The titanium tetrachloride, which is additionally added into the retort after finishing the reduction process and decreasing temperature in the retort, is used as a source of chemical destruction of the sponge.

This invention resolves problems of saving energy that would be expended for destruction of the titanium sponge and excluding oxidation or nitriding of titanium during disintegration of the powder. The cost-effective semi-continuous process is proposed for transformation of non-separated sponge into the titanium dichloride ($TiCl_2$) by supplying some additional amount of titanium tetrachloride ($TiCl_4$) in vacuum. The titanium tetrachloride is supplied from the bottom as the gas under pressure of 0.25 atmospheres when residual magnesium and magnesium chloride are still remained in the retort along with the titanium sponge.

This process is based on the reaction (6):

$$Ti+TiCl_4=2TiCl_2 \qquad (6)$$

Temperature in the reaction retort 5 is maintained in the range less than 1035° C. (below the melting point of titanium dichloride) that results in the formation of titanium dichloride ($TiCl_2$) as the solid phase. The titanium sponge is destroyed due to big difference in a specific weight of titanium and solid titanium dichloride (see Table 1). A broken block of titanium sponge liberates liquid magnesium (melting point 650° C.) and liquid magnesium chloride (melting point 714° C.) from pores of the sponge. The difference in a specific weight of liquid magnesium (1.74 g/cm³), liquid magnesium chloride $MgCl_2$ (2.32 g/cm³), and solid titanium dichloride $TiCl_2$ (3.13 g/cm³) favors their lamination in the retort.

After the completion of the formation of solid titanium dichloride, both liquid magnesium and magnesium chloride are removed from the retort using vacuum separation that is controlled by the adjusting temperature in the retort.

Dissociation of titanium dichloride according to the reaction (7) begins simultaneously with the above mentioned vacuum separation of metallic magnesium and magnesium chloride from pores of the titanium sponge.

$$2TiCl_2=Ti+TiCl_4 \qquad (7)$$

Hydrogen heated to 1000° C. is purged into the retort to accelerate the process of dissociation of titanium dichloride (see FIG. 4). Titanium tetrachloride is removed from the retort and directed to a new cycle of reduction titanium tetrachloride by magnesium according to well known Kroll process. After removing titanium tetrachloride from retorts, hydrogen is supplied into the retort from the bottom at pressure of 0.25 atmospheres and temperature 400-650° C., and hydrogenation of titanium is carried out in retorts 6. In contrast to all known methods, the manufactured titanium hydride powder is exceptionally fine, and it can be transferred into a suspension easily.

When the hydrogenation is finished, argon is supplied through the layer of titanium hydride powder in order to increase productivity by cooling the product down to 150° C. and forming a sort of fluidized bed layer of the powder suspension. Also, argon moves the titanium hydride powder through a hole in the retort lid into a cyclone separator and sleeve filters that are designated to adsorb fine powder of titanium hydride. Small amounts of powder residues in the retort are removed by using any conventional technique. For example, the fine titanium powder can be removed from 7 using vacuum pump into a tank for cooling down to 150° C. and storing.

Example

A. The reaction mass in the retort after the reduction process (regular Kroll's process) consists of the following components (calculation per 100 kg of the reaction mass):

100 kg=50 kg Ti+30 kgMg+20 kgMgCl₂

B. The titanium tetrachloride is added in amount necessary:
(a) for transformation of 50 kg of titanium Ti to titanium dichloride $TiCl_2$ Ti+TiCl₄>2TiCl₂

This reaction requires 190 kg of titanium tetrachloride $TiCl_4$.
(b) for using 30 kg of magnesium Mg in the reduction reaction TiCl₄+2Mg>Ti+2MgCl₂ additional 120 kg of $TiCl_4$ are needed, and in so doing, additional 30 kg of titanium sponge will be formed in the retort.
(c) additional 114 kg of titanium tetrachloride $TiCl_4$ are needed for transforming said new-made titanium sponge (about 30 kg) into the titanium dichloride $TiCl_2$.

Hence the total amount of titanium tetrachloride $TiCl_4$ added to the retort (per 100 kg of initial reaction mass) is 190+120+114=424 kg After the completion of the step of titanium dichloride dissociation, only 80 kg of titanium will be remained in the retort because all magnesium will be spent for the reduction reaction.

Doing this way, the production yield of titanium per an equipment goes up to 60%:

(80−50)/50=+60%

In other words, about 310 kg of titanium tetrachloride $TiCl_4$ is needed per 100 kg of initial reaction mass in order to manufacture titanium hydride powder from a block of titanium sponge 424−114=310 kg If recalculate to a specific consumption, this is 310/80=3.86 kg of titanium tetrachloride $TiCl_4$ per 1 kg of final product by one technological cycle and one equipment unit.

In contrast to traditional technology including steps of removing titanium sponge from the reactor, cutting it layer-by-layer, crushing, transportation inside the shop and between the units, —the new technology includes only additional steps of transportation and heating 3.86 kg of titanium tetrachloride $TiCl_4$ to the process temperatures. This is much less of energy consumption than that needed for the destruction of a block of titanium sponge. A ratio of energy consumptions is 1:5. (All calculations were made for theoretical 100% yield of product for every technological step).

Comparative Example and Comparison with the Invented Method

TABLE 3

| Objects | Comparative example (conventional technology) | Example of the invented method (Technology is based on reaction: Ti + TiCl$_4$ > TiCl$_2$) |
|---|---|---|
| Description of the process | 1. reduction<br>TiCl$_4$ + 2Mg = Ti + 2MgCl$_2$<br>2. replacing the retort in the unit of vacuum separation<br>3. vacuum separation<br>4. replacing the retort to a ejection press<br>5. discharging of the sponge block and crushing it in a laminate cutting machine (press)<br>6. hydrogenation of loose titanium sponge<br>7. grinding of titanium hydride powder to customized particle size distribution | 1. reduction<br>TiCl$_4$ + 2Mg = Ti + 2MgCl$_2$<br>2. supplying of excessive TiCl$_4$ into the retort above the reaction mass consisting of 50% Ti + 30% Mg + 20% MgCl$_2$ to obtain TiCl$_2$<br>3. dissociation of 2TiCl$_2$ > Ti + TiCl$_4$ in vacuum with simultaneous removing of MgCl$_2$<br>4. hydrogenation of titanium in the form of fine, dispersed mass<br>5. "suction" of fine, dispersed mass of titanium hydride |
| Change of the equipment | | Traveling crane for replacing retorts to different units - not available<br>A laminate cutting machine (press) - not available |
| Energy consumption per unit of the product | About 70% use of magnesium Mg for manufacturing titanium Ti powder.<br>Additional energy is needed for melting magnesium used in a new cycle | 1. Time of the separation cycle is cut due to the absence of the magnesium removing step. All magnesium reacted with the excess of titanium tetrachloride, and magnesium chloride does not remain in pores of the sponge because there is no sponge in the process, while the fine, dispersed titanium powder is available<br>2. No energy is needed for the sponge crushing and disintegration, as well no energy for grinding is needed<br>3 No traveling cranes are needed because all retorts are steady<br>4. If the process is semi-continuous, it is carried out in one retort<br>5. 100% use of magnesium Mg for manufacturing titanium Ti powder, and excluding energy consumption of melting magnesium for the new cycle<br>6. Increase of specific productivity per 1 m$^2$ of the shop area |
| Quality of the product | | Significantly lower content of oxygen in titanium powder due to the absence of grinding steps and limitation of contacts with atmospheric moisture |
| Drawbacks | Low productivity, low economical effectiveness, higher content of oxygen in titanium powder | Too fine powder |
| Capital outlays | 1.0 | 0.4 |
| Maintenance costs | 1.0 | 0.6 |
| Manufacturing costs (total) | 1.0 | 0.8 |
| The essence of the process | | Use of additional TiCl$_4$ for the destruction of a titanium sponge block that results in cutting of capital outlays and maintenance costs of the manufacture of the titanium hydride powder |

We claim:

1. A continuous and semi-continuous process of manufacturing titanium hydride using titanium chlorides of different valency comprising the following reaction-concerning and operational stages:

(a) blowing in hydrogen at 800-900° C. into a reaction retort filled with liquid titanium tetrachloride (TiCl$_4$), initiating reduction of TiCl$_4$ to titanium trichloride (TiCl$_3$) and partial reduction of TiCl$_4$ to titanium dichloride (TiCl$_2$) according to equations (1) and (2):

$$2TiCl_4+H_2=2TiCl_3+2HCl \quad (1)$$

$$TiCl_4+H_2=TiCl_2+2HCl \quad (2)$$

at 500-700° C. (1) or 650-850° C. (2) followed by cooling a mixture of TiCl$_4$, TiCl$_3$, and TiCl$_2$ down to 40-50° C., condensation of titanium trichloride (TiCl$_3$) and titanium dichloride (TiCl$_2$) in a solid phase, and removing a mixture of solid reaction products from the retort;

(b) separating of residual titanium tetrachloride (TiCl$_4$) from solid low chlorides by heating the mixture of all titanium chlorides in argon or vacuum up to 150° C. followed by removing the titanium tetrachloride (TiCl$_4$) from the mixture;

(c) dissociation of titanium trichloride (TiCl$_3$) to titanium dichloride (TiCl$_2$) at 450° C. in vacuum according to a reaction (3) or additional reduction of titanium trichloride (TiCl$_3$) to titanium dichloride (TiCl$_2$) by hydrogen according to the reaction (2) followed by removal of gaseous titanium tetrachloride from the reaction zone, condensation to the liquid, and returning back into the reaction retort, while the solid titanium dichloride is subjected to the next step of process;

$$2TiCl_3=TiCl_2+TiCl_4 \quad (3)$$

(d) dissociation of titanium dichloride (TiCl$_2$) in vacuum at 750-850° C. to manufacture fine powder of metallic titanium and titanium tetrachloride (TiCl$_4$) according to a reaction (4), wherein hydrogen heated up to 1000° C. is used at a pressure above the atmospheric pressure in order to accelerate this reaction and to remove gaseous titanium tetrachloride (TiCl$_4$) from the reaction zone to condensate the liquid, which is returned in the reaction retort of the step (a);

$$2TiCl_2=Ti+TiCl_4 \quad (4)$$

(e) saturation of the fine titanium powder by hydrogen at 400-640° C. to manufacture final product of titanium hydride powder which is free of oxygen or nitrogen.

2. The continuous and semi-continuous process of manufacturing titanium hydride using titanium chlorides of different valency according to claim 1, wherein after completing the step (a) and removing from the reaction retort, which is working in a continuous mode, the mixture of reaction products is charged into a stainless steel retort and transported through the following zones of the technological system:

(a) the zone of separating and removing titanium tetrachloride (TiCl$_4$) from a solid mixture of titanium trichloride (TiCl$_3$) and titanium dichloride (TiCl$_2$), (b) the zone of dissociation of titanium trichloride (TiCl$_3$) for titanium dichloride (TiCl$_2$) and titanium tetrachloride (TiCl$_4$) followed by the removal of the latter, (c) the zone of dissociation of titanium dichloride (TiCl$_2$) for the metallic titanium powder and titanium tetrachloride (TiCl$_4$) followed by the removal of the latter, (d) the zone of hydrogenation of the metallic titanium powder by hydrogen, (e) the zone of cooling the obtained titanium hydride powder, (f) the zone of discharging the titanium hydride powder from the retort, and (g) the zone of preparing the stainless steel retort to a new cycle charge of titanium chlorides from the reaction retort.

3. The continuous and semi-continuous process of manufacturing titanium hydride using titanium chlorides of different valency according to claim 1, wherein several stainless steel processing retorts are placed around the reaction retort, and the mixture of reaction products after the step (a) is charged subsequently into each of these processing retorts which are not transported but all operational steps are accomplished in every one of said processing retorts by supplying hydrogen and cooling of the resulting titanium hydride powder from the bottom, while the discharge of the powder from each retort is carried out by vacuuming.

4. The continuous and semi-continuous process of manufacturing titanium hydride using titanium chlorides of different valency according to claim 1, wherein titanium trichloride (TiCl$_3$) and titanium dichloride (TiCl$_2$) are subjected in the gaseous or liquid state to a rotated drum in a vacuum or hydrogen chamber, where all said processing reactions and steps are accomplished in a thin surface layer, and the resulting brittle powder of titanium hydride is discharged from the drum surface.

5. The continuous and semi-continuous process of manufacturing titanium hydride using titanium chlorides of different valency according to claim 3, wherein the sequence of processing steps is as following:

(a) separating and removing titanium tetrachloride (TiCl$_4$) from a solid mixture of titanium trichloride (TiCl$_3$) and titanium dichloride (TiCl$_2$) is carried out at 150° C., whereby the step is finished after obtaining the mixture of solid titanium trichloride (TiCl$_3$) and titanium dichloride (TiCl$_2$) without a trace of the titanium tetrachloride (TiCl$_4$);

(b) supplying hydrogen from the bottom of the retort at 400° C. accompanied with continuous removal of hydrogen chloride and residual hydrogen from the retort, whereby the step is finished after full transformation of titanium trichloride (TiCl$_3$) into the titanium dichloride (TiCl$_2$);

(c) dissociation of titanium dichloride (TiCl$_2$) for metallic titanium and titanium tetrachloride (TiCl$_4$) followed by removing the latter, whereby the step is finished after full transformation of titanium dichloride (TiCl$_2$) into the metallic titanium and full removal of the titanium tetrachloride (TiCl$_4$);

(d) hydrogenation of the titanium powder by hydrogen at 400-640° C., whereby the step is finished after saturation of the powder by hydrogen and termination of hydrogen adsorption;

(e) cooling the titanium hydride by cold hydrogen to accelerate the process, whereby the step is finished after the temperature of titanium hydride product below 150° C.;

(f) discharging of the resulting titanium hydride from the processing retort using a vacuum device; and (g) preparing the processing retort to the next cycle charge of the titanium chloride mixture from the reaction retort.

6. The continuous and semi-continuous process of manufacturing titanium hydride using titanium chlorides of different valency according to claim 4, wherein the sequence of processing steps is as following:

(a) separating and removing titanium tetrachloride (TiCl$_4$) from a solid mixture of titanium trichloride (TiCl$_3$) and titanium dichloride (TiCl$_2$) is carried out at 150° C., whereby the step is finished after obtaining the mixture of solid titanium trichloride (TiCl$_3$) and titanium dichloride (TiCl$_2$) without a trace of the titanium tetrachloride (TiCl$_4$);

(b) supplying hydrogen from the bottom of the retort at 400° C. accompanied with continuous removal of hydrogen chloride and residual hydrogen from the retort, whereby the step is finished after full transformation of titanium trichloride (TiCl$_3$) into the titanium dichloride (TiCl$_2$);

(c) dissociation of titanium dichloride (TiCl$_2$) for metallic titanium and titanium tetrachloride (TiCl$_4$) followed by removing the latter, whereby the step is finished after full transformation of titanium dichloride (TiCl$_2$) into the metallic titanium and full removal of the titanium tetrachloride (TiCl$_4$);

(d) hydrogenation of the titanium powder by hydrogen at 400-640° C., whereby the step is finished after saturation of the powder by hydrogen and termination of hydrogen adsorption;

(e) cooling the titanium hydride by cold hydrogen to accelerate the process, whereby the step is finished after the temperature of titanium hydride product below 150° C.;

(f) discharging of the resulting titanium hydride from the processing retort using a vacuum device; and (g) preparing the processing retort to the next cycle charge of the titanium chloride mixture from the reaction retort.

7. The continuous and semi-continuous process of manufacturing titanium hydride using titanium chlorides of different valency according to claim 1, wherein the hydrogen is blown in the retort at the height that is ⅓ of the total height of the reaction retort filled with the liquid titanium tetrachloride.

8. The continuous and semi-continuous process of manufacturing titanium hydride using titanium chlorides of different valency according to claim 1, wherein the reduction of TiCl$_4$ to titanium trichloride (TiCl$_3$) and partial reduction of TiCl$_4$ to titanium dichloride (TiCl$_2$) according to equations (1) and (2):

$$2TiCl_4+H_2=2TiCl_3+2HCl \qquad (1)$$

$$TiCl_4+H_2=TiCl_2+2HCl \qquad (2)$$

occur at the gas-liquid interface (where the gas is hydrogen, while the liquid is TiCl$_4$), whereby the gaseous titanium trichloride (TiCl$_3$) is resulted from this reaction followed by cooling the mixture of TiCl$_4$ and TiCl$_3$ down to 40-50° C. to provide condensation of titanium trichloride (TiCl$_3$) and titanium dichloride (TiCl$_2$) in the solid phase which is removed from the retort.

9. The continuous and semi-continuous process of manufacturing titanium hydride using titanium chlorides of different valency according to claim 1, wherein the hydrogen chloride HCl gas is evolved during the above mentioned reactions and directed to a chlorinator that is filled with a liquid salt of sodium chloride NaCl Both compounds HCl and NaCl are used fro chlorination of titanium slag or artificial rutile in presence of carbon at ~900° C. according to the equation (5):

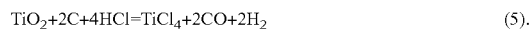
$$TiO_2+2C+4HCl=TiCl_4+2CO+2H_2 \qquad (5).$$

10. The continuous and semi-continuous process of manufacturing titanium hydride using titanium chlorides of different valency according to claim 8, wherein hydrogen is used further in the next cycle for blowing-in into a tank of cleaned titanium tetrachloride (TiCl$_4$), while the carbon monoxide gas (CO) is used for heating the sodium chloride liquid in the chlorinator, and the titanium tetrachloride (TiCl$_4$) goes to cleaning.

11. The continuous and semi-continuous process of manufacturing titanium hydride using titanium chlorides of different valency according to claim 1, wherein the titanium tetrachloride (TiCl$_4$) resulted from the step 1 (d) is condensed and directed into the reaction retort in order to provide high grade of purity of the titanium tetrachloride, because all impurities left in the solid titanium.

12. The continuous and semi-continuous process of manufacturing titanium hydride using titanium chlorides of different valency according to claim 5, wherein the reaction retort is made from a stainless steel and equipped with a number of input tubing having many holes used for the distributed supply of hot hydrogen in the bath that is filled with the liquid titanium tetrachloride (TiCl$_4$), whereby these tubing also are playing the role of evaporator of the titanium tetrachloride (TiCl$_4$) in order to provide an effective evaporation in the zone heated by hydrogen and the reaction of the titanium tetrachloride in the gaseous phase with hydrogen at hot surface of said tubing.

13. The continuous and semi-continuous process of manufacturing titanium hydride using titanium chlorides of different valency according to claim 1, wherein the semi-continuous process uses a titanium sponge obtained from the Kroll's process of magnesium-thermic reduction of titanium tetrachloride TiCl$_4$ as a raw material and uses the low chlorides of titanium for destruction of the titanium sponge, whereby the titanium tetrachloride, which is additionally added into the retort after finishing the reduction process and decreasing temperature in the retort, is also used as a source of chemical destruction of the sponge.

14. The continuous and semi-continuous process of manufacturing titanium hydride using titanium chlorides of different valency according to claim 2, wherein an accelerated condensation of titanium tetrachloride (TiCl$_4$) and a removal of hydrogen from the appropriate reaction retorts are undertaken in the chlorinator design in order to avoid the reaction between hydrogen and titanium tetrachloride (TiCl$_4$) that may promote a formation of low chlorides of titanium before the operation of cleaning titanium from impurities.

* * * * *